No. 787,046. Patented April 11, 1905.

UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN & ANILINFARBEN-FABRIK, OF OFFENBACH-ON-THE-MAIN, GERMANY.

CLARET-RED MORDANT DYE AND PROCESS OF MAKING SAME.

SPECIFICATION forming part of Letters Patent No. 787,046, dated April 11, 1905.

Application filed January 7, 1905. Serial No. 240,083.

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, Germany, have invented certain new and useful Improvements in Claret-Red Mordant Dyes, of which the following is a specification.

My invention relates to the manufacture of valuable mordant coloring-matters dyeing on wool from an acid-bath yellow shades, which on subsequently treating with chromium compounds acting as oxidizing agents are changed into a claret red distinguished by an excellent fastness. These coloring-matters result from the combination of 6.2-nitro-diazophenol-4-sulfonic acid with cresotinic acids, such as ortho- and meta-cresotinic acid.

In the following example I shall illustrate my invention and how it may be carried out and brought into practical effect, parts being by weight and degrees referring to the centigrade scale.

Diazotize in the usual manner 23.4 parts of 2.6-nitro-amidophenol-4-sulfonic acid by means of forty-five parts of hydrochloric acid of 20° Baumé and 6.9 parts of sodium nitrite. Allow the diazo solution to run into a solution, well cooled with ice, from sixteen parts of meta-cresotinic acid and two hundred parts of water and eighty parts of sodium lye of 35° Baumé. In order to complete the formation of the dyestuff, stir for twelve hours. As the dyestuff is very easily soluble, isolate it by acidulating the combination liquor with hydrochloric acid and then precipitate it completely by common salt. It forms in its dry state a yellowish-red powder, dissolving in concentrated sulfuric acid with a reddish-yellow and in water with a reddish-orange color. The aqueous solution becomes a little altered by hydrochloric acid, but on addition of sodium lye it changes to red. The dyestuff yields on wool from an acid-bath a reddish yellow, which on after treatment with a chromium compound turns to a yellowish-claret red.

The corresponding dyestuff from o-cresotinic acid forms a yellowish powder and yields on subsequently treating with a chromium mordant shades of some bluer tinge. These dyeings are distinguished by an excellent fastness to light milling and steaming.

Now what I claim, and desire to secure by Letters Patent, is the following:

1. The production of mordant dyes, which yield on wool reddish-yellow shades, turning to claret red on subsequently treating with a chromium agent, by combining 2.6-nitro-diazophenol-4-sulfonic acid with cresotinic acids, substantially as described.

2. As new articles of manufacture the coloring-matters, which result from combining 2.6-nitro-diazophenol-4-sulfonic acid with cresotinic acid form yellow to yellowish-red powder, dissolve in concentrated sulfuric acid to a reddish yellow, in water on addition of sodium lye to a red solution and dye on wool reddish-yellow shades, being changed to a claret red on subsequently treating with a chromium agent, all substantially as hereinbefore described.

In testimony that I claim the foregoing as my invention I have signed my name, in presence of two witnesses, this 23d day of December, 1904.

AUGUST LEOPOLD LASKA.

Witnesses:
EVA SATTLER,
OSKAR STANDHARDT.